(12) United States Patent
Dohi (10) Patent No.: US 11,104,010 B2
(45) Date of Patent: Aug. 31, 2021

(54) WORKPIECE GRIPPING HAND, HAND SYSTEM, AND ROBOT SYSTEM

(71) Applicant: FANUC CORPORATION, Yamanashi (JP)

(72) Inventor: Yoshiaki Dohi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 121 days.

(21) Appl. No.: 16/682,105

(22) Filed: Nov. 13, 2019

(65) Prior Publication Data

US 2020/0156265 A1 May 21, 2020

(30) Foreign Application Priority Data

Nov. 16, 2018 (JP) .............................. JP2018-215423

(51) Int. Cl.
*B25J 15/08* (2006.01)

(52) U.S. Cl.
CPC ..................................... *B25J 15/08* (2013.01)

(58) Field of Classification Search
CPC . B25J 15/08; B25J 15/10; B25J 15/083; B25J 15/086; B25J 9/123; B65G 47/90
USPC .......................................... 294/115, 116, 113
See application file for complete search history.

(56) References Cited

U.S. PATENT DOCUMENTS

| | | | | | |
|---|---|---|---|---|---|
| 4,304,433 | A | * | 12/1981 | Langowski | .............. E21B 19/14 294/106 |
| 4,368,913 | A | * | 1/1983 | Brockmann | ......... B25J 15/0266 294/106 |
| 4,810,019 | A | * | 3/1989 | Brucher | .................... B23Q 1/76 294/106 |
| 5,284,375 | A | * | 2/1994 | Land, III | ................ E21B 19/14 294/115 |
| 5,975,605 | A | * | 11/1999 | Kot | .......................... B25B 5/122 269/224 |
| 8,419,097 | B2 | * | 4/2013 | Lunde | ..................... E21B 19/14 294/198 |
| 10,913,166 | B1 | * | 2/2021 | Rohl | ........................ B25J 9/123 |

(Continued)

FOREIGN PATENT DOCUMENTS

| | | |
|---|---|---|
| JP | S58090489 A | 5/1983 |
| JP | H06335887 A | 12/1994 |

(Continued)

OTHER PUBLICATIONS

English Abstract and Machine Translation for Japanese Publication No. 2009-107079 A, published May 21, 2009, 16 pgs.

(Continued)

*Primary Examiner* — Paul T Chin
(74) *Attorney, Agent, or Firm* — Fredrikson & Byron, P.A.

(57) ABSTRACT

A workpiece gripping hand includes a first movable member and a second movable member which cooperate with each other to grip an object, a first drive unit which linearly moves the first movable member, a support unit which rotatably supports the second movable member, a link member which is linked to the first movable member and the second movable member, and which rotates the second movable member by transmitting a linear motion of the first movable member to the second movable member, and a second drive unit which moves the support unit to change a position of a center of rotation of the second movable member.

10 Claims, 9 Drawing Sheets

(56) References Cited

U.S. PATENT DOCUMENTS

2006/0290153 A1* 12/2006 Delescluse ............... C25C 3/10
                                                                           294/115
2017/0341131 A1* 11/2017 Hayashi ................ B21K 27/04

FOREIGN PATENT DOCUMENTS

| JP | 2004358608 A | 12/2004 |
| JP | 2009-107079 A | 5/2009 |
| JP | 2009274204 A | 11/2009 |

OTHER PUBLICATIONS

English Machine Translation for Japanese Publication No. JPS58-090489A, published May 30, 1983, 9 pgs.
English Abstract and Machine Translation for Japanese Publication No. JPH06-335887A, published Dec. 6, 1994, 16 pgs.
English Abstract and Machine Translation for Japanese Publication No. JP2004-358608A, published Dec. 24, 2004, 21 pgs.
English Abstract and Machine Translation for Japanese Publication No. JP2009-274204A, published Nov. 26, 2009, 35 pgs.

* cited by examiner

FIG. 1

FRONT ←→ REAR

WORKPIECE GRIPPING HAND, HAND SYSTEM, AND ROBOT SYSTEM

BACKGROUND OF THE INVENTION

1. Field of the Invention

The present invention relates to a workpiece gripping hand, a hand system, and a robot system comprising a robot which is equipped with the workpiece gripping hand.

2. Description of Related Art

The hands of industrial robots which perform workpiece handling are required to handle workpieces having different dimensions in some cases. Japanese Unexamined Patent Publication (Kokai) No. JP2009-107079A describes a hand which is configured so as to be capable of gripping workpieces of differing dimensions by providing a pair of openable and closable L-shaped links, and interchangeably attaching fingers which grip the workpiece on the tip side of the L-shaped links via finger attachment bases.

SUMMARY OF THE INVENTION

In a link-type hand as described in JP2009-107079A, differences in the outer shapes of the workpieces can be a factor that changes the gripping force exerted on the workpiece. Such changing of the gripping force can cause failures in the handling of the workpiece. Thus, there is a demand for a workpiece gripping hand, a hand system, and a robot system comprising a robot equipped with such a workpiece gripping hand which are capable of adjusting the gripping force so that workpieces can be gripped with a constant gripping force even when the outer shapes of the workpieces change.

An aspect of the present disclosure provides a workpiece gripping hand comprising a first movable member and a second movable member which cooperate with each other to grip an object, a first drive unit which linearly moves the first movable member, a support unit which rotatably supports the second movable member, a link member which is linked to the first movable member and the second movable member, and which rotates the second movable member by transmitting a linear motion of the first movable member to the second movable member, and a second drive unit which moves the support unit to change a position of a center of rotation of the second movable member.

Another aspect of the present disclosure provides a hand system comprising the above workpiece gripping hand, and a controller which controls the second drive unit to adjust a gripping force generated by the linear motion of the first movable member and the rotation of the second movable member.

Yet another aspect of the present disclosure provides a robot system comprising the above workpiece gripping hand, a robot equipped with the workpiece gripping hand, and a controller which controls the workpiece gripping hand and the robot, wherein the controller comprises an input unit which accepts setting input of a gripping force, a calculation unit configured to calculate the position of the center of rotation when the gripped part is gripped with the gripping force based on the gripping force accepted by the input unit and external dimensions of a gripped part of an object, and a hand control unit configured to control the second drive unit in accordance with the calculated position of the center of rotation.

BRIEF DESCRIPTION OF THE DRAWINGS

The object, features, and advantages of the present invention will be elucidated by means of the description of the embodiments below with reference to the attached drawings. In the attached drawings.

DETAILED DESCRIPTION

The embodiments of the present disclosure will be described below with reference to the attached drawings. In the drawings, corresponding constituent elements are assigned common reference signs. To facilitate understanding, the scales of the drawings have been appropriately modified. Furthermore, the forms shown in the drawings are merely examples for carrying out the present invention. The present invention is not limited to the illustrated forms.

Figure 1:
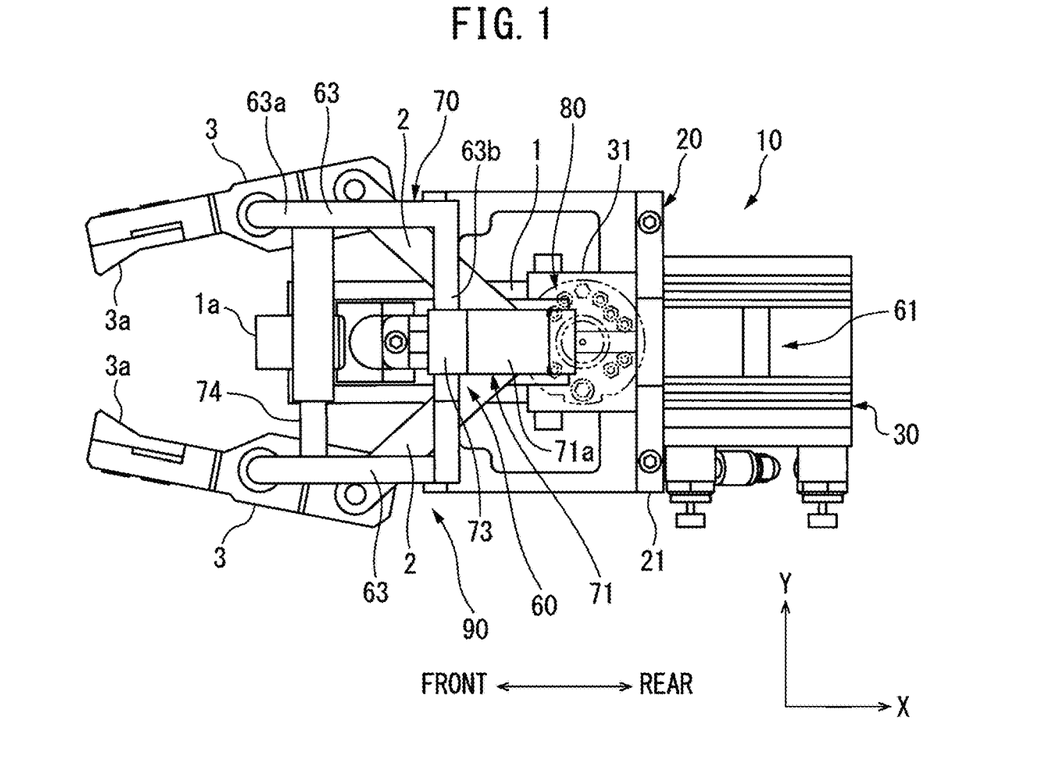
FIG. 1 is a top view of a hand.
Figure 2:
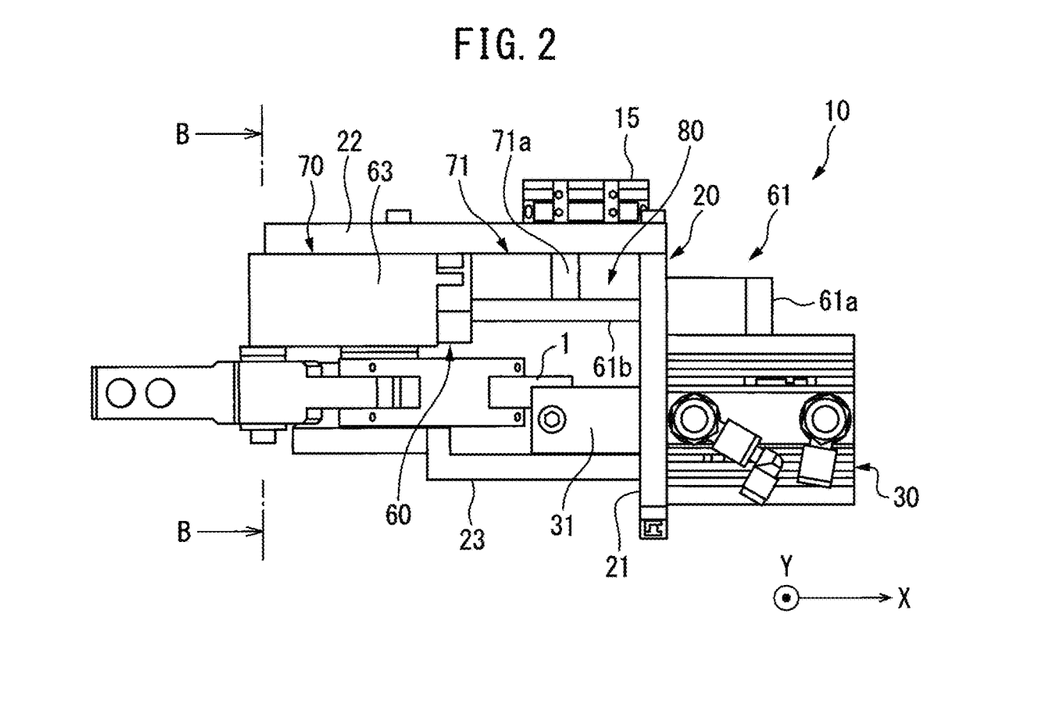
FIG. 2 is a side view of the hand.
Figure 3:
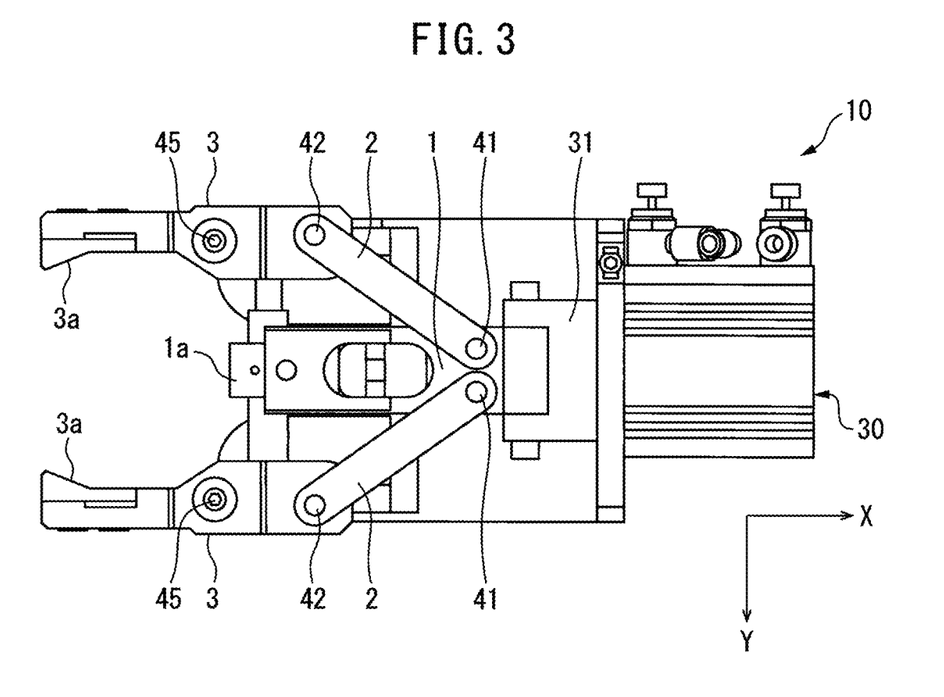
FIG. 3 is a bottom view of the hand.
Figure 4:
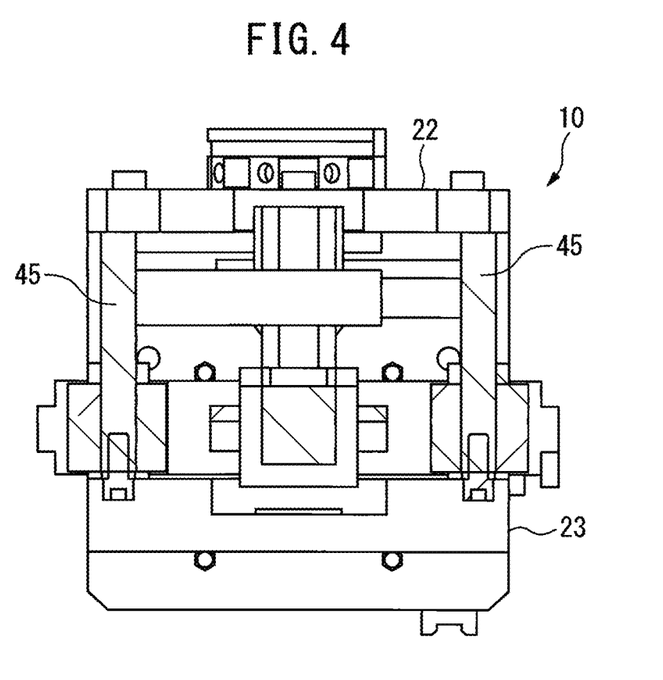
FIG. 4 is a cross-sectional view of the hand as viewed from the front side at the position represented by arrows B in FIG. 2.

The workpiece gripping hand (hereinafter referred to simply as "hand") 10 according to an embodiment will be described below. FIG. 1 is a top view of the hand 10, FIG. 2 is a side view of the hand 10, and FIG. 3 is a bottom view of the hand 10. FIG. 4 is a cross-sectional view of the hand 10 as viewed from the front side at the position represented by arrows B in FIG. 2. The hand 10 comprises a first movable member 1 and second movable members 3 which cooperate with each other to grip an object (hereinafter referred to as a workpiece), a first drive unit 30 which linearly moves the first movable member 1, a support unit 90 which rotatably supports the second movable members 3, link members 2 which are linked to the first movable member 1 and the second movable members 3 and which rotates the second movable members 3 by transmitting the linear motion of the first movable member 1 to the second movable members 3, and a second drive unit 80 which moves the support unit 90 to change the positions of the centers of rotation of the second movable members 3. For the convenience of explanation, in FIG. 1, the side on which the second movable members 3 are present is defined as the front side, and the side opposite thereto is defined as the rear side. Note that, in FIG. 1, an upper cover 22 has been omitted, and in FIG. 3, a lower cover 23 has been omitted.

The support unit 90 comprises a first movable slide 60 which moves along a first axis orthogonal to the axes of rotation of the second movable members 3, and a second movable slide 70 which is mounted on the first movable slide 60 and which moves along a second axis orthogonal to both the axes of rotation of the second movable members 3 and the first axis. The second drive unit 80, which moves the support unit 90, comprises an X-direction drive device 61 and a Y-direction drive device 71. In the description below, the first axis is defined as the axis (X-axis) parallel to the direction of the linear motion of the first movable member 1, and the second axis is defined as the Y-axis (refer to FIG. 1).

As shown in FIG. 2, the hand 10 comprises a support wall 21 arranged on the rear side thereof, the upper cover 22 attached to the support wall 21 so as to project forwardly from the upper end of the support wall 21, and the lower cover 23 attached to the support wall 21 so as to project forwardly from the lower end of the support wall 21. A robot attachment unit 15 for attachment with the tip of an arm of a robot is arranged in a position on the rear side of the upper surface of the upper cover 22. The support wall 21, upper cover 22, and lower cover 23 constitute a base 20 of which the position is fixed with respect to the tip of the arm of the robot.

The first drive unit 30, which includes a movable unit 31 which is movable in the forward and rearward directions, is fixed to the support wall 21. The first drive unit 30 is, for example, a linear motion cylinder. As shown in FIG. 3, to the movable unit 31, the proximal end of the first movable member 1, which has a substantially rectangular shape in a top view and which is formed so as to extend in the forward and rearward directions, is connected. The proximal ends of a pair of link members 2 are attached to the first movable member 1 so as to be freely rotatable via a pair of first link pins 41. The proximal ends of a pair of second movable members 3 are attached to the tip portions of the pair of link members 2 so as to be freely rotatable via a pair of second link pins 42. With this configuration, when the first drive unit 30 is driven, the pair of link members 2 transmit the linear motion of the first movable member 1 to the pair of second movable members 3 to rotate the pair of second movable members 3 about the centers of rotation thereof (support pins 45). Specifically, when the first movable member 1 is driven forwardly, grip parts 3a on the front ends of the pair of second movable members 3 close, and when the first movable member 1 is driven rearwardly, the grip parts 3a of the pair of second movable members 3 open. The support pins 45, which are the centers of rotation of the second movable members 3, extend perpendicular to the XY plane, and constitute the axes of rotation of the second movable members 3.

The support unit 90 supports the second movable members 3 so as to be rotatable about the support pins 45. The first movable slide 60 is mounted so as to be movable in the X-axis direction relative to the base 20, and the second movable slide 70 is mounted on the first movable slide 60 so as to be movable in the Y-axis direction relative to the first movable slide 60. The second movable slide 70 is connected to the support pins 45, and rotatably supports the second movable members 3. The positions of the support pins 45, which serve as the axes of rotation of the second movable members 3, can be adjusted in the XY plane by moving the support unit 90 in the XY plane. The first movable slide 60 is driven in the X-axis direction by the X-direction drive device 61. The X-direction drive device 61 comprises a servo motor 61a fixed to the support wall 21, and a ball screw 61b connected with the drive shaft of the servo motor 61a. The first movable slide 60 includes a support base 73. The support base 73 includes a threaded part (not illustrated) for threadedly engaging with the ball screw 61b, and the support base 73 is reciprocally moved in the X-axis direction by the rotation of the ball screw 61b.

The second movable slide 70 includes two arm parts 63 which are bent in an L-shape in a top view. The proximal ends 63b of the two arm parts 63 are connected with the support base 73 so as to be movable in the Y-axis direction, and the distal ends 63a of the two arm parts 63 are integrally connected with the support pins 45. The second movable slide 70 is driven in the Y-axis direction by a Y-direction drive device 71 comprising a servo motor 71a. Specifically, the servo motor 71a is secured to the support base 73, and an interlock mechanism for causing the two arm parts 63 to approach and separate each other in accordance with the rotation of the drive shaft of the servo motor 71a is provided on the support base 73. Furthermore, portions of the tip sides of the two arm parts 63 are supported by a support member 74 which is expandable in the Y-axis direction. The two arm parts 63 can be reciprocally driven in the Y-axis direction in opposite directions by the driving of the servo motor 71a.

As a result of the above configuration, when the first movable slide 60 moves in the X-axis direction, the second movable slide 70 also moves in the X-axis direction, whereby the positions of the support pins 45 (i.e., the axes of rotation of the second movable members 3) can be adjusted in the X-axis direction. Furthermore, when the interval between the two arm parts 63 in the Y-axis direction changes, the interval between the support pins 45 (i.e., the axes of rotation of the second movable members 3) in the Y-axis direction can be changed accordingly. By moving the first movable slide 60 and second movable slide 70 to adjust the positions of the support pins 45 in this manner, the gripping force when the workpiece is gripped with the grip parts 3a of the second movable members 3 and the distal end 1a of the first movable member 1 can be adjusted.

Figure 5:
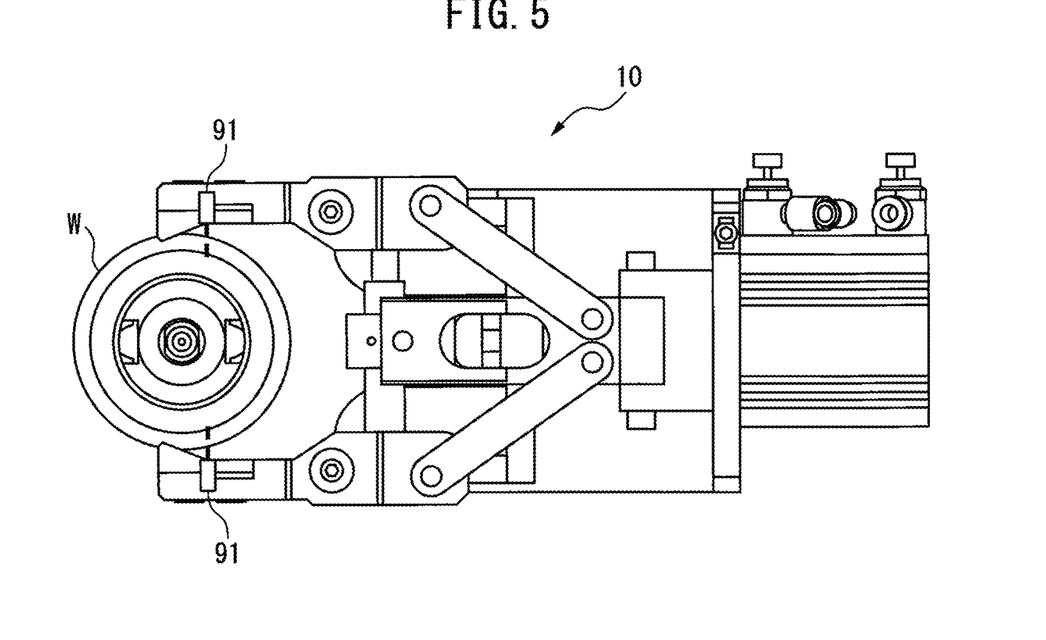
FIG. 5 is a view showing the configuration of the hand, which includes sensors for measuring external dimensions of a workpiece.

The hand 10 may be configured so as to be capable of measuring the external dimensions of the workpiece. FIG. 5 shows a configuration example of the hand 10 in which distance sensors 91 are arranged in the vicinities of the grip parts 3a of the second movable members 3, whereby the hand 10 is capable of measuring the external dimensions of the gripped part of the workpiece W. Various types of sensors which are known in the art such as infrared sensors, ultrasonic sensors, and laser sensors can be used as the distance sensors 91.

Figure 6:
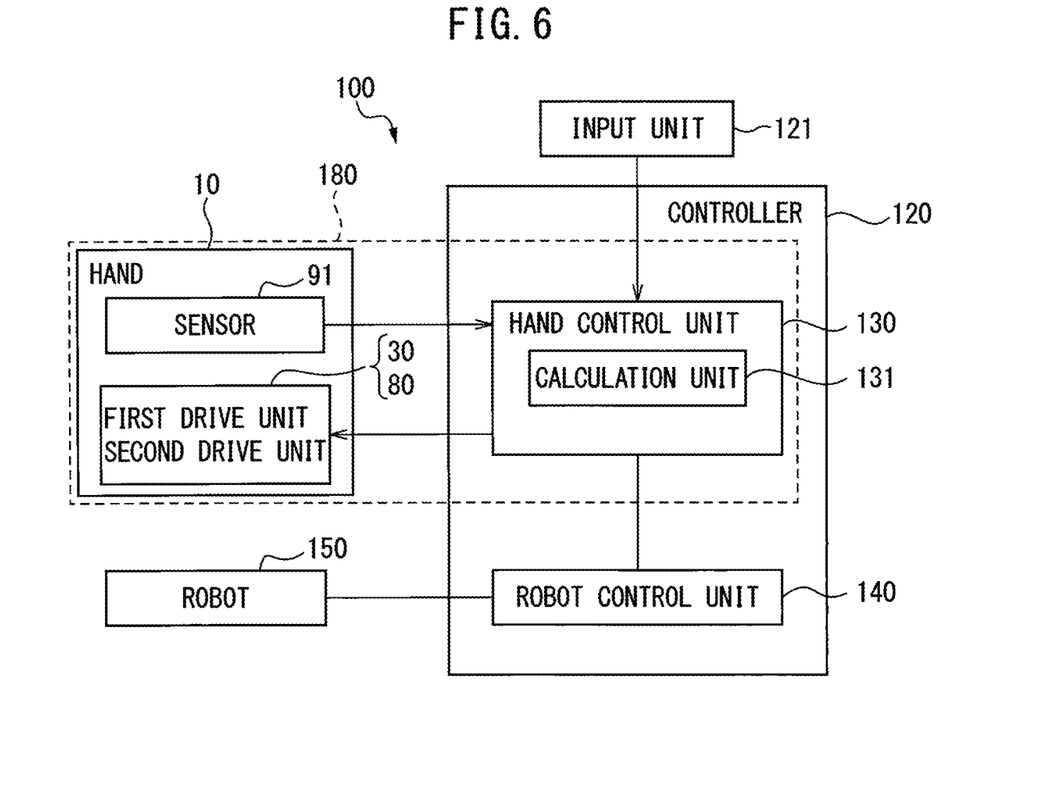
FIG. 6 is a block diagram of a robot system.

FIG. 6 is a functional block diagram of a robot system 100 comprising a hand 10, a robot 150 equipped with the hand 10, and a controller 120 which controls the hand 10 and the robot 150. The controller 120 comprises a hand control unit 130 for controlling the hand 10, and a robot control unit 140 for controlling the robot 150. The controller 120 may be configured as a conventional computer comprising a CPU, ROM, RAM, a storage unit, operation units, a display unit, etc. The controller 120 comprises an input unit 121 which accepts setting input regarding the gripping force when the workpiece is gripped with the hand 10. The hand control unit 130 comprises a calculation unit 131 which calculates the position of the support pins 45 for gripping the workpiece with the input gripping force, and calculates the center position of the workpiece. The calculation unit 131 determines the external dimensions of the workpiece based on the output of the distance sensors 91, and calculates the positions of the support pins 45 so as to attain the gripping force based on the external dimensions of the workpiece and the input gripping force. Note that "gripping force" as used herein means the gripping force for gripping the workpiece with the distal end 1*a* of the first movable member 1 and the gripping parts 3*a* of the second movable members 3. The positions of the support pins 45 may be calculated as positions in a hand coordinate system fixed to the hand 10. The controller 120 controls the hand 10 (servo motors 61*a*, 71*a*) so as to position the support pints 45 at the calculated positions. As a result, the hand 10 grips the workpiece with the input gripping force. Note that the gripping force may be stored in advance in a storage device within the controller 120.

The calculation unit 131 calculates the position of the geometric center of the workpiece based on the external dimensions of the workpiece and the positions of the support pins 45. The calculated position of the geometric center of the workpiece is transmitted to the robot control unit 140, and the robot control unit 140 calculates deviation of the center of the workpiece from a reference position (e.g., the distal end of the arm) of the position control of the robot 150, and corrects the position of the workpiece in a robot coordinate system. As a result, the robot 150 can accurately position the workpiece.

Note that the hand 10 and the hand control unit 130, which have the functions described above, can be configured as constituent elements of a hand system 180, as represented by the dashed line in FIG. 6.

Figure 7:
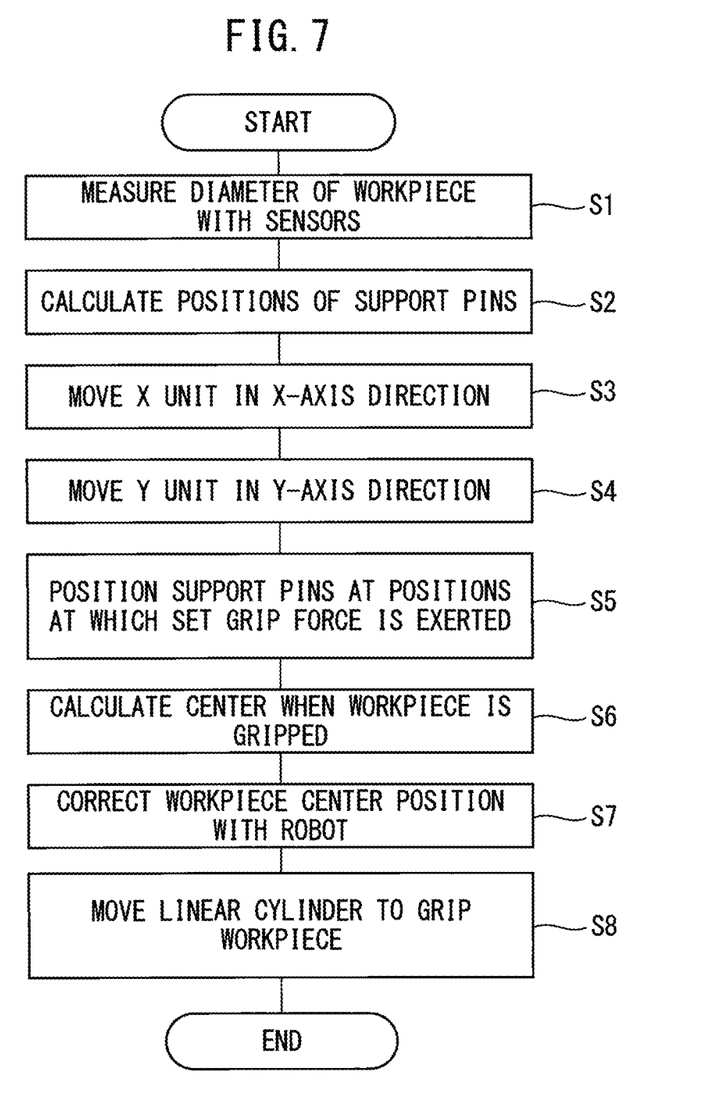
FIG. 7 is a flowchart illustrating a gripping force adjustment process.

FIG. 7 is a flowchart showing a process including adjustment of the workpiece gripping force and correction of the workpiece position described above (hereinafter referred to as a gripping force adjustment process). The process of FIG. 7 is executed under control of the CPU of the controller 120. Herein, the gripped part of the workpiece W will be assumed as cylindrical. First, the controller 120 moves the distance sensors 91 of the hand 10 close to the gripped part of the workpiece W and measures the diameter of the gripped part (step S1). Next, the calculation unit 131 of the controller 120 calculates the positions of the support pins 45 for gripping the workpiece W with the input gripping force based on the diameter of the workpiece W and the input gripping force (step S2).

Figure 8:
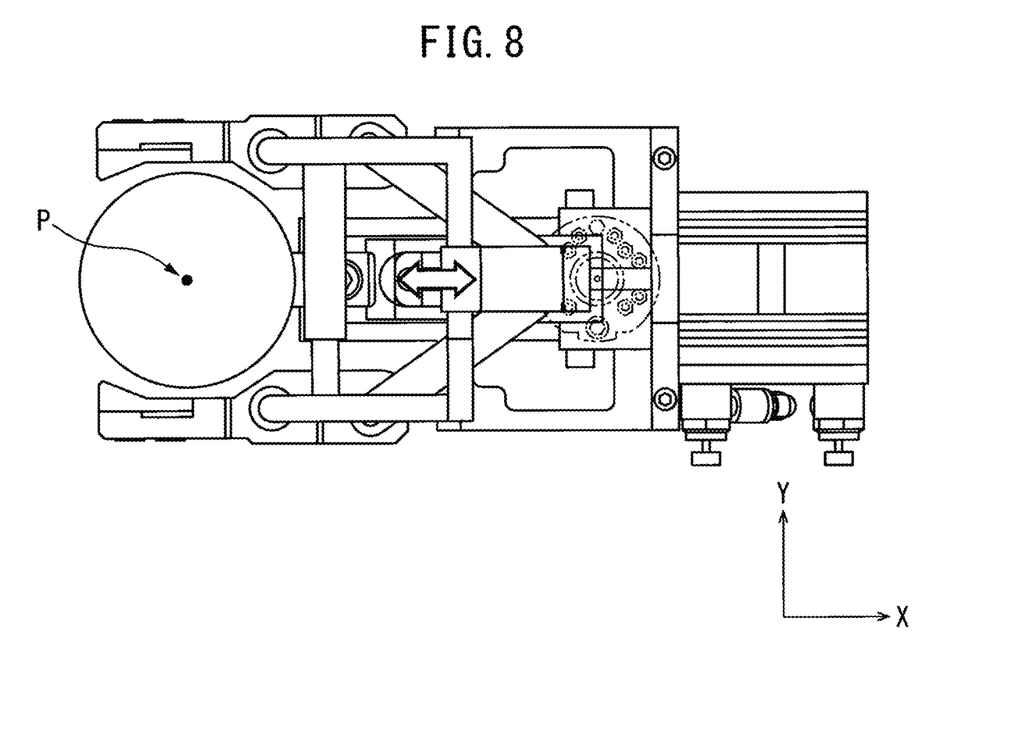
FIG. 8 is a view detailing a state in which a first movable slide is moved in the X-axis direction.
Figure 9:
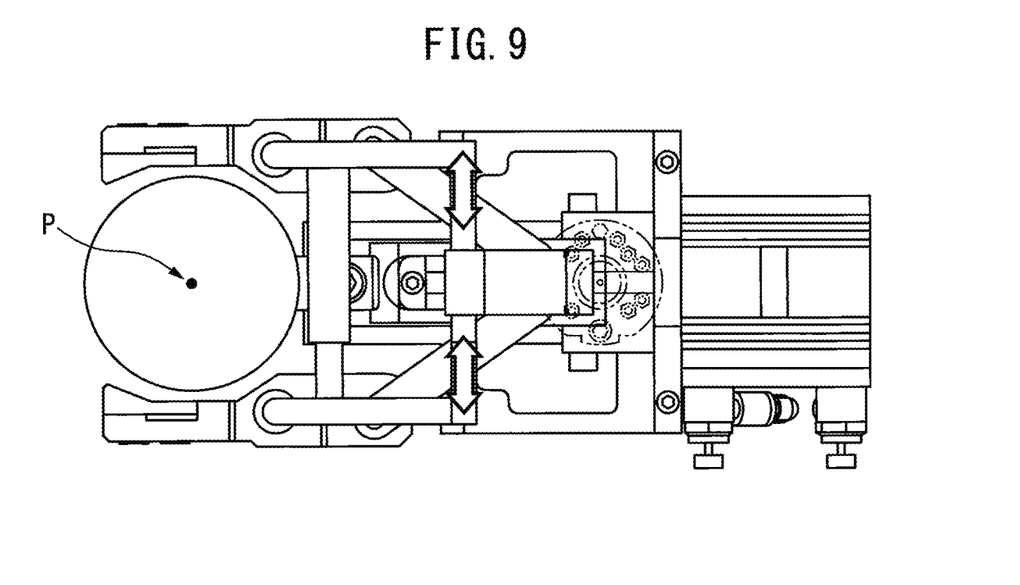
FIG. 9 is a view detailing a state in which a second movable slide is moved in the Y-axis direction.

Next, the controller 120 moves the first movable slide 60 (X unit) in the X-axis direction as indicated by an arrow in FIG. 8 by rotating the servo motor 61*a* to position the support pins 45 at the X coordinates calculated in step S2 (step S3). Further, the controller 120 moves the second movable slide 70 (Y unit) in the Y-axis direction as indicated by arrows in FIG. 9 by rotating the servo motor 71*a* to position the support pins 45 at the Y coordinates calculated in step S2 (step S4). As a result, the support pins 45 can be positioned at positions at which the hand 10 can grip the workpiece W with the input gripping force (step S5).

Next, the calculation unit 131 of the controller 120 calculates the center position P of the workpiece W based on the diameter of the workpiece W and the positions of the support pins 45 (step S6).

Figure 10:
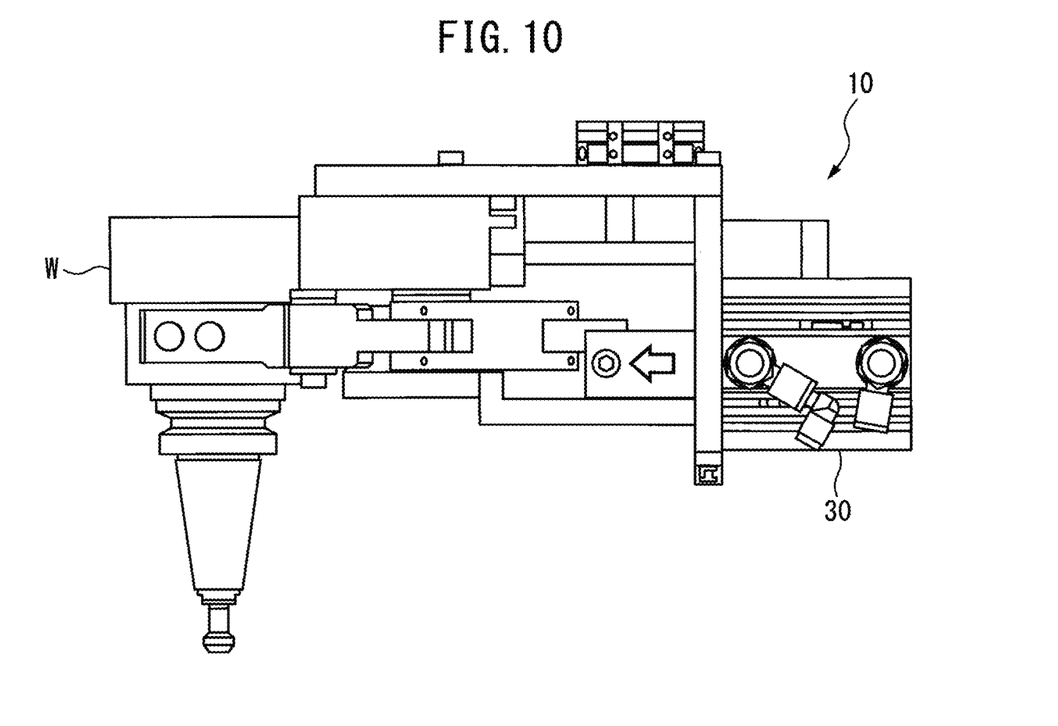
FIG. 10 is a side view of the hand showing a state in which a workpiece is gripped due to driving of a first drive unit.
Figure 11:
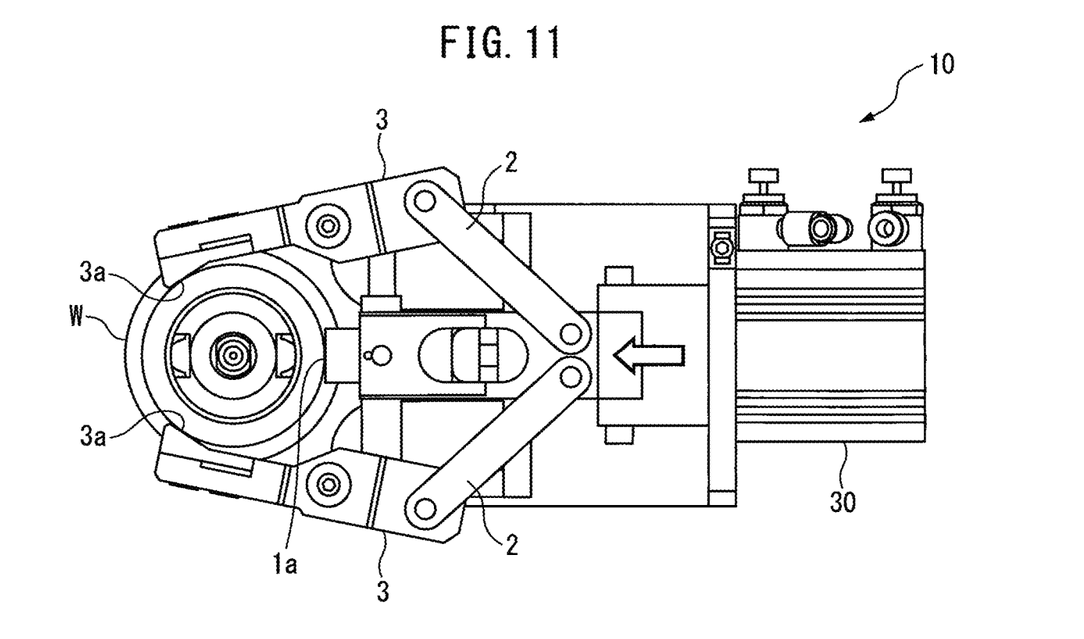
FIG. 11 is a bottom view of the hand showing a state in which a workpiece is gripped due to driving of the first drive unit.

Next, the controller 120 transmits the center position of the workpiece W determined in step S6 to the robot control unit 140. As a result, the robot control unit 140 can acquire the deviation amount of the center position of the workpiece W relative to a reference position (the distal end of the arm, etc.) of the position control of the robot 150, and can correct the center position of the workpiece W in the robot coordinate system (step S7). Next, the controller 120 drives the first drive unit 30 to grip the workpiece W (step S8). FIGS. 10 and 11 are a side view and bottom view (the lower cover 23 has been omitted), respectively, of the hand 10 showing a state in which the workpiece W has been gripped by driving the first drive unit 30. As shown in FIGS. 10 and 11, the workpiece W is gripped at three positions by each of the grip parts 3*a* of the second movable members 3 and the distal end 1*a* of the first movable member 1. According to the foregoing, the robot 150 can perform handling of the workpiece W while accurately positioning the workpiece W.

According to the gripping force adjustment process described above, the workpiece can be accurately gripped by the hand 10 with the input gripping force. Thus, the hand 10 can grip the workpiece with a constant clamping force even if the external dimensions of the workpiece W handled by the hand 10 change. Furthermore, even if the external dimensions of the workpiece vary, the robot 150 can accurately position the workpiece by calculating the position of the geometric center thereof.

The above gripping force adjustment process can be stored as a program on any of various types of computer readable storage media such as ROM, RAM, flash memory, HDD, CD-ROM, and DVD-ROM.

Figure 12:
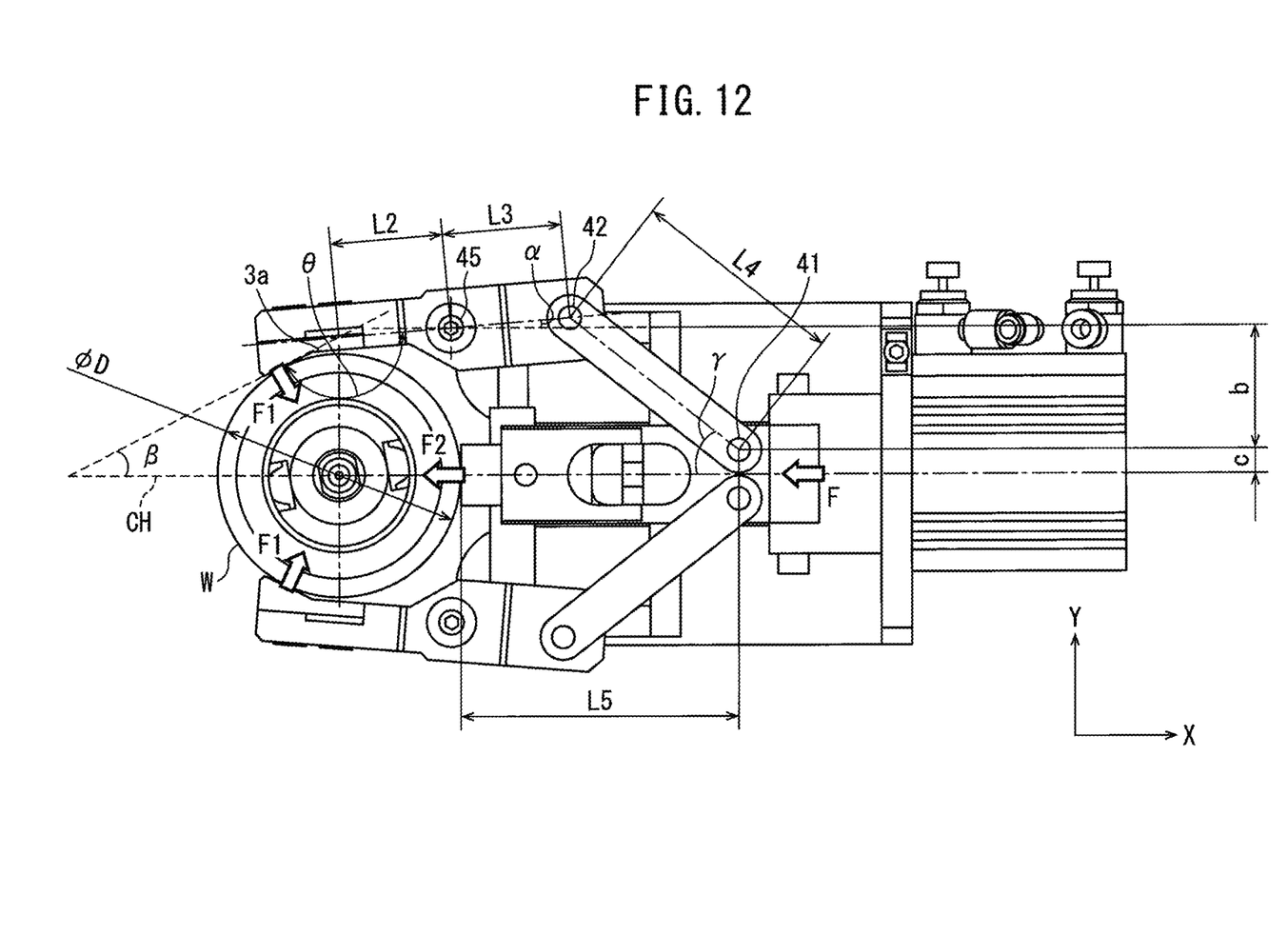
FIG. 12 is a view showing an example of the settings of geometric parameters for support pin position calculation or the like, FIG. 13 is a view showing the assignment of reference signs to aid support pin position calculation or the like, and FIG. 14 is a view showing the assignment of reference signs to aid workpiece center position calculation.
Figure 13:
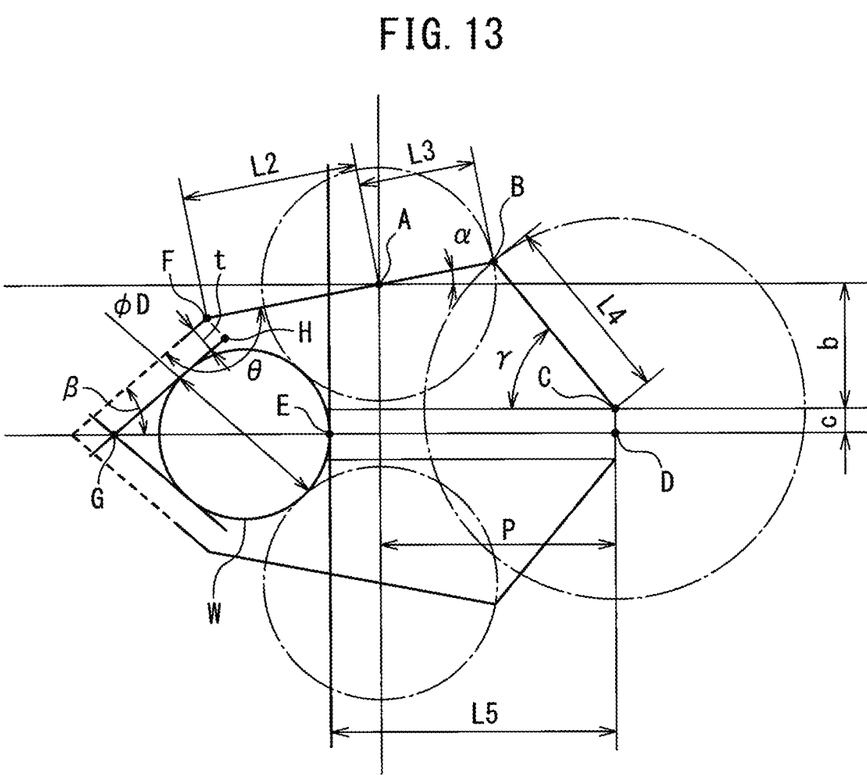
Figure 14:
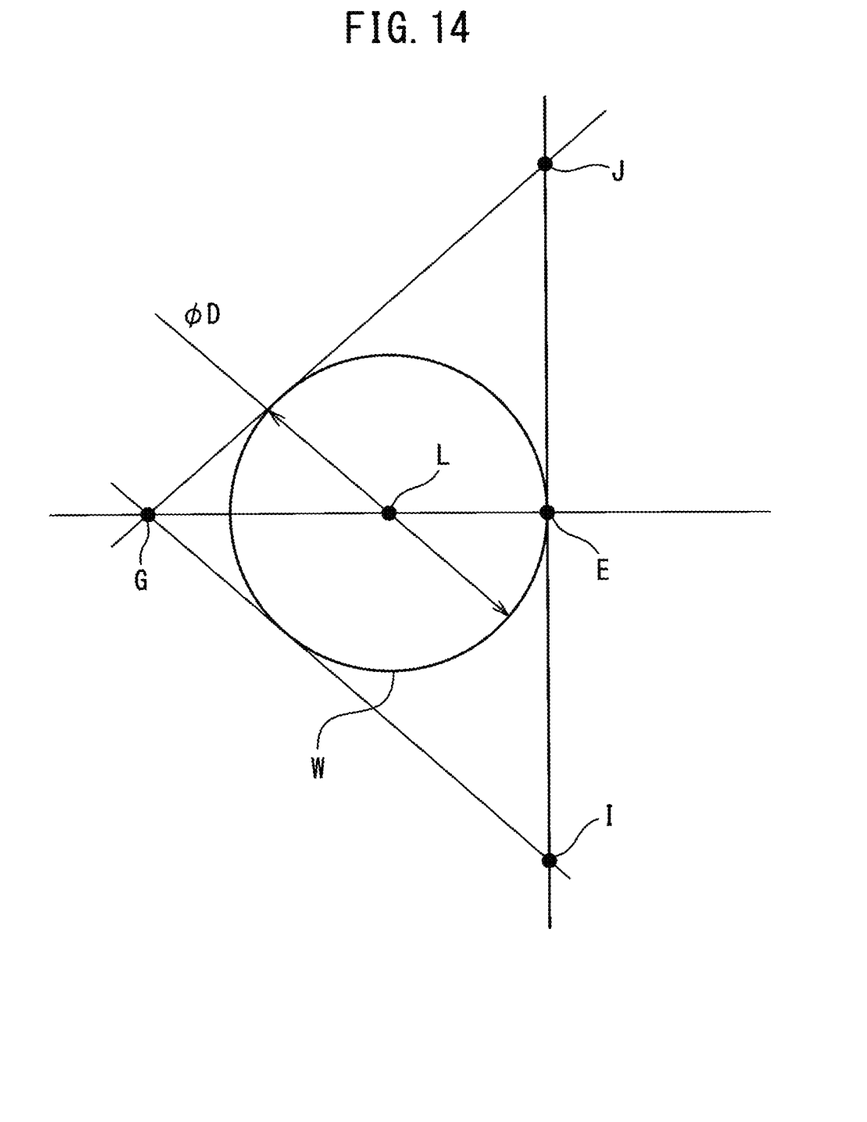

An example for calculating the positions of the support pins 45 and the geometric center of the workpiece based on the external dimensions of the workpiece and the gripping force will be described. By setting geometric parameters necessary for calculation as shown in FIG. 12, the correspondence between the gripping forces F1, F2, the positions of the support pins 45, and the driving force F of the first drive unit can be determined, and the center position of the workpiece W can be calculated. The gripped part of the workpiece will be assumed as cylindrical. The definitions of each of the parameters shown in FIG. 12 are described below. Note that FIGS. 13 and 14 are views to assist the calculation using the parameters shown in FIG. 12, and in the following calculation examples, the symbols assigned in FIGS. 13 and 14 are used as is appropriate.

L2: The distance between the center of the support pin 45 and the position at which an extension of a straight line connecting the center of the second link pin 42 with the center of the support pin 45 intersects an inclined surface (grip part 3*a*) inside the distal end of the second movable member 3

L3: The distance between the center of the second link pin 42 and the center of the support pin 45

L4: The distance between the center of the first link pin 41 and the center of the second link pin 42

L5: The distance from the center of the first link pin 41 to the distal end 1*a* of the first movable member 1 in the X-axis direction c: The distance between the center line CH of the first movable member 1 and the center of the first link pin 41 b: The distance from the center of the first link pin 41 to the support pin 45 in the Y-axis direction φD: The diameter of the workpiece α: The angle formed between the straight line (L3) connecting the support pin 45 with the second link pin 42 and the X-axis β: The angle formed between the inclined surface (grip part 3*a*) on the inside of the distal end of the second movable member 3 and the X-axis γ: The angle between the center line of the link member 2 and the X-axis θ: The angle formed between an extension of the straight line connecting the center of the second link pin 42 with the center of the support pin 45 and the inclined surface (grip part 3a) on the inside of the distal end of the second movable member 3

In FIG. 12, F1 represents the gripping forces of the grip parts 3a of the second movable members 3 acting on the workpiece, F2 represents the gripping force of the distal end 1a of the first movable member 1 acting on the workpiece, and F represents the pressing force exerted by the first drive unit to move the first movable member 1 in the forward direction. The relationship between the positions of the support pins 45, the gripping forces F1, F2, and the drive force F of the first drive unit 30 can be obtained by using each of the angles ($\alpha$, $\beta$, $\gamma$, $\theta$), the lengths (L2 to L5) of the parts, and the diameter $\varphi D$ of the workpiece. The following are examples of formulas for calculating F1 and F2.

$$F1 = L3 \cdot \cos\gamma \cdot \sin(\gamma+\alpha)/(2(2\sin\beta + (L2+A_H)\cos(\beta-\alpha))) \cdot F$$

$$A_H = A_G \times \cos(\alpha+\beta)$$

$A_G$ = The distance between point $H$ and the position at which line segment $GH$ contacts the outline of the workpiece $$F2 = 2 \cdot F1 \cdot \sin\beta$$

The symbols shown in FIG. 14 are assigned to the intersections of the lines tangent to the outline of the workpiece to assist calculating the workpiece center position L (Lx, Ly). Examples of formulas for calculating the center L (Lx, Ly) of the workpiece are shown below. Note that the coordinates of the points have the origin defined at the position of the support pin 45 on the upper side on the drawing.

$$Lx = (JI \cdot Gx + GI \cdot Ix + GI \cdot Jx)/(GJ+GI+JI)$$

$$Ly = (JI \cdot Gy + GI \cdot Iy + GI \cdot JY)/(GJ+GI+JI)$$

Examples of the calculation results of the parameters by the calculation methods described above are shown in Table 1 below.

TABLE 1

| Parameter | Calc Ex 1 | Calc Ex 2 | Calc Ex 3 |
|---|---|---|---|
| L2 (unit: mm) | 41.82 | 41.82 | 41.82 |
| L3 (unit: mm) | 37.05 | 37.05 | 37.05 |
| L4 (unit: mm) | 73 | 73 | 73 |
| L5 (unit: mm) | 91 | 91 | 91 |
| c (unit: mm) | 8 | 8 | 8 |
| b (unit: mm) | 40 | 40 | 40 |
| $\varphi D$ (unit: mm) | 67.94 | 49.52 | 22.19 |
| $\alpha$ (°) | 14.8 | 24.6 | 37.5 |
| $\beta$ (°) | 33.13 | 42.93 | 55.83 |
| $\gamma$ (°) | 42.66 | 49.40 | 58.97 |
| $\theta$ (°) | 161.67 | 161.67 | 161.67 |
| t (mm) | 0 | 0 | 0 |
| F1 (N) | 197.78 | 191.73 | 152.58 |
| F2 (N) | 216.19 | 261.17 | 252.48 |
| F (N) | 982 | 982 | 982 |
| P (mm) | 89.51 | 81.2 | 67.02 |
| G ($G_X$, $G_Y$) | (−97.61, −48.00) | (−70.91, −48.00) | (−48.48, −48.00) |
| L ($L_X$, $L_Y$) | (−35.46, −48.00) | (−34.56, −48.00) | (−35.07, −48.00) |
| | Calc Ex 4 | Calc Ex 5 | Calc Ex 6 |
| L2 (unit: mm) | 43.03 | 43.03 | 43.03 |
| L3 (unit: mm) | 36.8 | 36.8 | 36.8 |
| L4 (unit: mm) | 63 | 63 | 63 |
| L5 (unit: mm) | 90 | 90 | 90 |
| c (unit: mm) | 8 | 8 | 8 |
| b (unit: mm) | 34.5 | 34.5 | 34.5 |
| $\varphi D$ (unit: mm) | 53.98 | 37.55 | 22.04 |
| $\alpha$ (°) | 13.6 | 22.6 | 30.03 |
| $\beta$ (°) | 46.55 | 55.55 | 63.25 |
| $\gamma$ (°) | 43.23 | 50.54 | 57.39 |
| $\theta$ (°) | 147.05 | 147.05 | 147.05 |
| t (mm) | 0 | 0 | 0 |
| F1 (N) | 194.70 | 194.98 | 174.94 |
| F2 (N) | 282.70 | 321.56 | 312.44 |
| F (N) | 982 | 982 | 982 |
| P (mm) | 81.67 | 74.01 | 65.73 |
| G ($G_X$, $G_Y$) | (−72.50, −42.50) | (−57.54, −42.50) | (−47.63, −42.50) |
| L ($L_X$, $L_Y$) | (−35.32, −42.50) | (−34.77, −42.50) | (−35.29, −42.50) |

In Table 1 above, the positions of the support pins 45 relative to the center (position D in FIG. 13) of the pair of first link pins 41 are represented by parameter P in the X-axis direction, and are represented by parameter b+c in the Y-axis direction. According to the above calculation examples, the positions of the support pins 45, the drive force F of the first drive unit 30, and the center position L (LX, LY) of the workpiece, which attain the input gripping forces (F1, F2), can be associated with each other.

Note that though, in the above calculation examples, calculation is performed under the assumption that the workpiece is cylindrical, calculation can be performed in the same manner for workpieces having shapes for which a geometric center can be defined, such as regular polygons. Furthermore, the settings of the parameters described above are merely exemplary, and various other parameters can be used as the parameters for associating the workpiece shape, the gripping forces, the positions of the support pins 45, and the geometric center of the workpiece.

According to the present embodiment as desried above, the gripping forces with which the object is gripped can be adjusted by moving the support unit.

Though the embodiments of the present disclosure have been described above, a person skilled in the art would understand that various modifications and changes can be made without deviating from the scope disclosed in the claims described later.

The invention claimed is:

1. A workpiece gripping hand, comprising:
   a first movable member and a second movable member which cooperate with each other to grip an object,
   a first drive unit which linearly moves the first movable member,
   a support unit which rotatably supports the second movable member,
   a link member which is linked to the first movable member and the second movable member, and which rotates the second movable member by transmitting a linear motion of the first movable member to the second movable member, and
   a second drive unit which moves the support unit to change a position of a center of rotation of the second movable member.

2. The workpiece gripping hand according to claim 1, wherein the support unit comprises:
   a first movable slide which moves along a first axis orthogonal to an axis of rotation of the second movable member; and
   a second movable slide which is mounted on the first movable slide and which moves along a second axis orthogonal to both the axis of rotation and the first axis, and the second movable member is supported on the second movable slide.

3. The workpiece gripping hand according to claim 2, wherein the second drive unit comprises:
   a first motor which reciprocally moves the first movable slide along the first axis; and
   a second motor which reciprocally moves the second movable slide along the second axis.

4. The workpiece gripping hand according to claim 1, comprising a pair of the second movable members which rotate in opposite directions in accordance with the linear motion of the first movable member.

5. The workpiece gripping hand according to claim 4, further comprising sensors which are arranged on the pair of the second movable members and which determine external dimensions of a gripped part of the object.

6. A hand system, comprising:
   the workpiece gripping hand according to claim 1, and
   a controller which controls the second drive unit to adjust a gripping force generated by the linear motion of the first movable member and the rotation of the second movable member.

7. The hand system according to claim 6, wherein the controller comprises a calculation unit configured to calculate a position of the center of rotation based on the external dimensions of the gripped part of the object and a gripping force for gripping the gripped part.

8. The hand system according to claim 7, wherein the calculation unit calculates a position of a geometric center of the gripped part based on the external dimensions of the gripped part and the position of the center of rotation.

9. A robot system, comprising:
   the workpiece gripping hand according to claim 1;
   a robot equipped with the workpiece gripping hand; and
   a controller which controls the workpiece gripping hand and the robot, wherein
   the controller comprises:
   an input unit which accepts setting input of a gripping force;
   a calculation unit configured to calculate the position of the center of rotation when the gripped part is gripped with the gripping force based on the gripping force accepted by the input unit and external dimensions of a gripped part of an object; and
   a hand control unit configured to control the second drive unit in accordance with the calculated position of the center of rotation.

10. The robot system according to claim 9, wherein the calculation unit calculates a position of a geometric center of the gripped part based on the external dimensions of the gripped part and the position of the center of rotation, and
   the controller corrects a position of the object in a robot coordinate system based on the calculated position of the geometric center.

* * * * *